(12) United States Patent
Costello

(10) Patent No.: US 7,473,204 B2
(45) Date of Patent: Jan. 6, 2009

(54) PROPELLER SHAFT ASSEMBLY WITH ENERGY STORAGE MECHANISM AND CONTROLLED CLUTCH

(75) Inventor: Scott T. Costello, Royal Oak, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 350 days.

(21) Appl. No.: 11/368,071

(22) Filed: Mar. 3, 2006

(65) Prior Publication Data

US 2007/0207889 A1 Sep. 6, 2007

(51) Int. Cl.
*F16H 3/74* (2006.01)
*F16H 35/10* (2006.01)
*F16D 7/04* (2006.01)
*B60K 6/00* (2007.10)
*B60K 25/10* (2006.01)
*B60K 8/00* (2006.01)

(52) U.S. Cl. .................... 475/263; 475/257; 464/37; 180/165

(58) Field of Classification Search ......... 475/263–264, 475/257, 267; 464/18–21, 37–41, 45–48, 464/179; 180/165, 298
See application file for complete search history.

(56) References Cited

U.S. PATENT DOCUMENTS 3,749,194 A * 7/1973 Bardwick, III ............... 180/165

| 4,159,042 A |   | 6/1979 | Jayner |
|---|---|---|---|
| 4,217,970 A | * | 8/1980 | Chika .......................... 180/298 |
| 4,319,655 A |   | 3/1982 | Hoppie |
| 4,333,553 A |   | 6/1982 | Hoppie et al. |
| 4,342,371 A | * | 8/1982 | Smitley ....................... 180/165 |
| 4,411,171 A | * | 10/1983 | Fiala ............................. 475/5 |
| 4,423,794 A |   | 1/1984 | Beck |
| 4,471,668 A | * | 9/1984 | Elsner ......................... 475/72 |
| 4,531,719 A |   | 7/1985 | Hoppie et al. |
| 5,014,837 A |   | 5/1991 | Kaari |
| 6,138,527 A | * | 10/2000 | Bitterly et al. ........... 74/572.12 |

FOREIGN PATENT DOCUMENTS

| JP | 55156724 | 5/1979 |
|---|---|---|
| JP | 11210485 | 1/1998 |

* cited by examiner

*Primary Examiner*—Tisha D Lewis
(74) *Attorney, Agent, or Firm*—Harness, Dickey & Pierce, P.L.C.

(57) ABSTRACT

A propeller shaft and energy storage assembly includes a first power transfer mechanism for selectively drivingly interconnecting the propeller shaft and an energy storage device to store energy within the energy storage device. A second power transfer mechanism is operable to selectively retain and release energy stored within the energy storage device. A third power transfer mechanism selectively drivingly interconnects the energy storage device and the propeller shaft when vehicle acceleration is desired.

30 Claims, 5 Drawing Sheets

PROPELLER SHAFT ASSEMBLY WITH ENERGY STORAGE MECHANISM AND CONTROLLED CLUTCH

BACKGROUND AND SUMMARY OF THE INVENTION

The present invention generally relates to an energy storage device for a vehicle and, more particularly, to a propeller shaft and energy storage assembly.

In view of recent events, fuel economy for automotive vehicles has become of great importance. Environmental concerns and governmental emissions regulations are also becoming pressing issues for automobile manufacturers. These and other considerations have driven manufacturers of automotive vehicles to consider alternate fuel sources such as solar power, fuel cells and natural gas. Battery powered and hybrid vehicles combining various power transmission techniques are also among a host of other concepts being evaluated.

Some vehicle manufacturers have also addressed the energy efficiency challenge by creating vehicles that weigh less and more efficiently cut through the air as they travel. While many of these devices and concepts have merit, opportunities exist for alternate designs.

One solution presently contemplated includes a propeller shaft and energy storage assembly having a propeller shaft with a first end adapted to be drivingly coupled to an engine and a second end adapted to be drivingly coupled to a driven wheel. The propeller shaft and energy storage assembly includes a first power transfer mechanism for selectively drivingly interconnecting the propeller shaft and an energy storage device when a vehicle is moving forward. A second power transfer mechanism is operable to selectively retain and release energy stored within the energy storage device. A third power transfer mechanism selectively drivingly interconnects the energy storage device and the propeller shaft when vehicle acceleration is desired. The release of the stored energy through the propeller shaft then assists the engine or other power source in accelerating the vehicle.

Another propeller shaft and energy storage assembly includes a propeller shaft having a first end adapted to be drivingly coupled to an engine and a second end adapted to be drivingly coupled to a driven wheel. The propeller shaft and energy storage assembly includes a first clutch selectively operable to drivingly interconnect the propeller shaft and a spring to store energy in the spring, a second clutch operable to restrict movement of the spring to retain the stored energy within the spring and a third clutch operable to selectively drivingly couple the spring and the propeller shaft to transfer the stored energy through the propeller shaft.

Furthermore, a method of storing and releasing energy in a vehicle including an engine drivingly coupled to a driveline where the driveline has a propeller shaft and an energy storage device is disclosed. The method includes placing the vehicle in motion and drivingly coupling the propeller shaft to the energy storage device to transfer energy from the moving vehicle to the energy storage device. The method also includes de-coupling the propeller shaft from the energy storage device and retaining the stored energy in the energy storage device. The energy from the energy storage device is then transferred to the propeller shaft by drivingly coupling the energy storage device with the propeller shaft to assist in accelerating the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
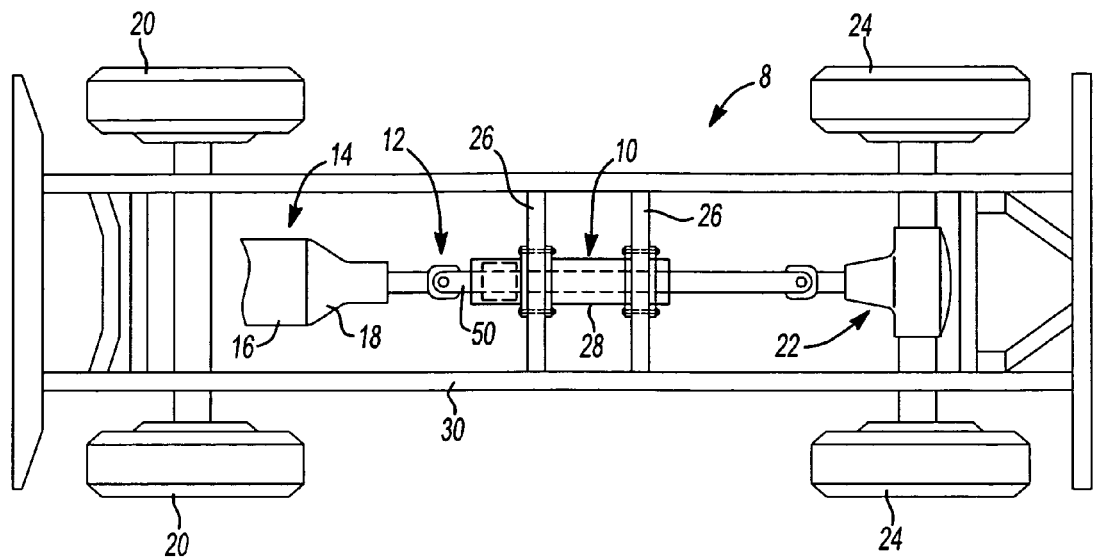
FIG. 1 is a schematic depicting an exemplary rear wheel drive vehicle having a driveline equipped with a propeller shaft and energy storage assembly.

With reference to FIG. 1, an exemplary vehicle 8 includes a propeller shaft and energy storage assembly 10. Vehicle 8 includes a driveline 12 which is drivable via a connection to a powertrain 14. The powertrain 14 includes an engine 16 and a transmission 18. The driveline 12 includes propeller shaft and energy storage assembly 10, a rear axle 22, a pair of front wheels 20 and a pair of rear wheels 24. Engine 16 is mounted in an in-line or longitudinal orientation along the axis of vehicle 8 and its output is selectively coupled via a conventional clutch to the input of the transmission 18 to transmit rotary power therebetween. The input of the transmission 18 is commonly aligned with the output of the engine 16 for rotation about a rotary axis. The propeller shaft and energy storage assembly 10 is coupled with an output member of transmission 18. Drive torque is transmitted through the propeller shaft and energy storage assembly 10 to the rear axle 22 where it is selectively apportioned in a predetermined manner to the left and right rear wheels 24. Support brackets 26 mount a housing 28 of propeller shaft and energy storage assembly 10 to a frame 30 of vehicle 8.

Figure 2:
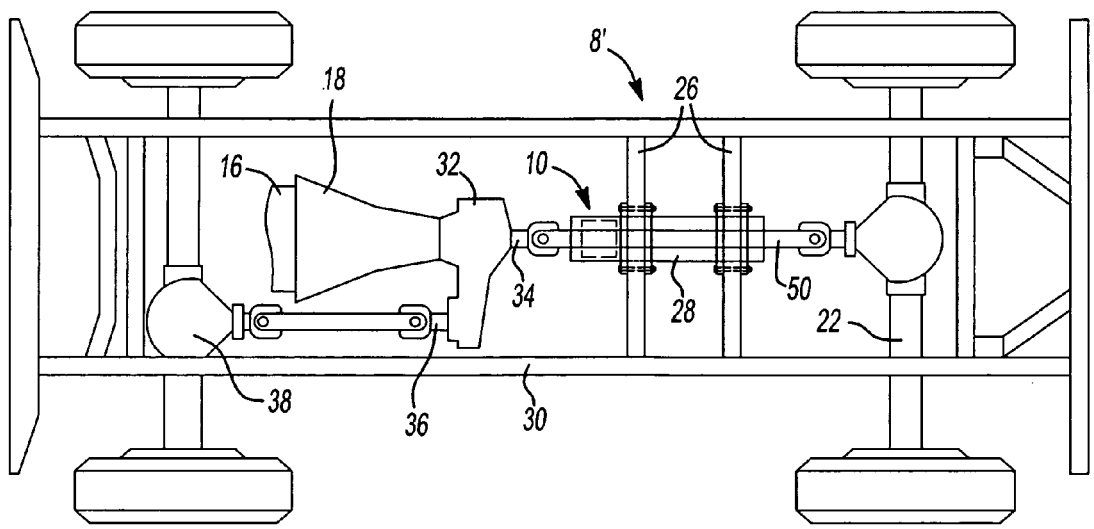
FIG. 2 is a schematic depicting another exemplary all wheel drive vehicle having an alternate driveline arrangement including the propeller shaft and energy storage assembly.

FIG. 2 depicts an alternate embodiment all wheel drive vehicle 8' configured substantially similarly to vehicle 8 except that a transfer case 32 is positioned within the driveline between transmission 18 and propeller shaft and energy storage assembly 10. Transfer case 32 has a first output shaft 34 drivingly coupling engine 16 with rear axle assembly 22. Transfer case 32 also has a second output shaft 36 drivingly coupling engine 16 with a front drive axle 38.

Figure 3:
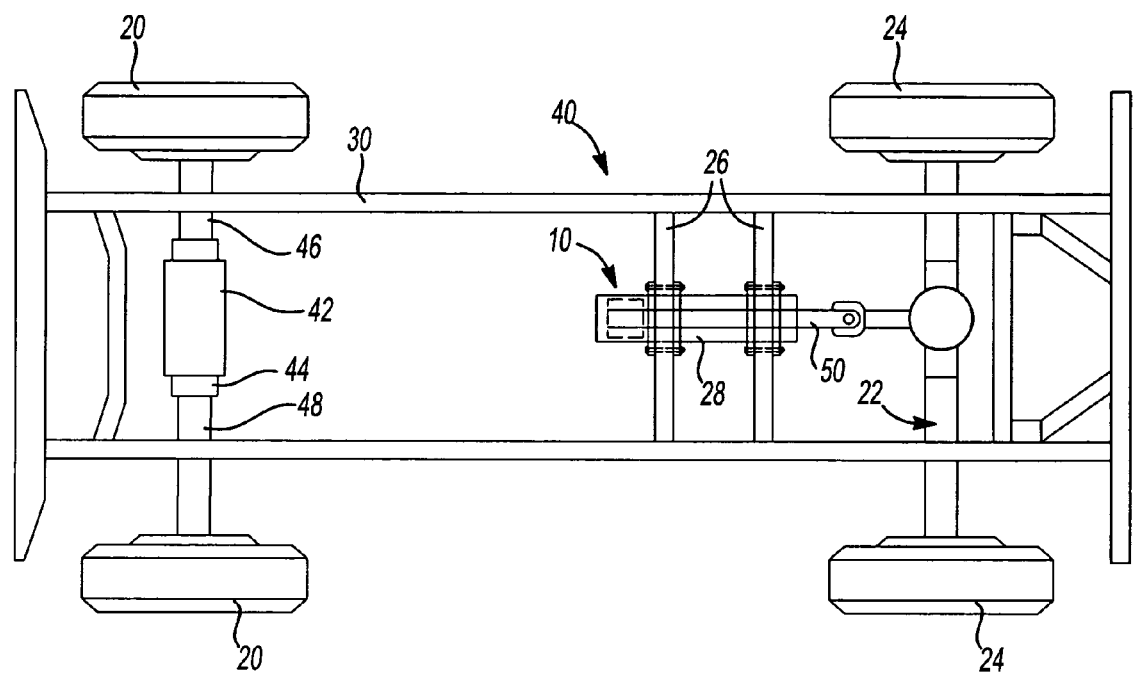
FIG. 3 is a schematic depicting an exemplary front wheel drive vehicle having an alternate driveline arrangement including the propeller shaft and energy storage assembly.

FIG. 3 depicts an alternate embodiment front wheel drive vehicle 40. Vehicle 40 includes a transversely oriented engine 42 drivingly coupled to a transmission 44. The output of transmission 44 is aligned with input stub shafts 46 and 48 such that torque is transferred from engine 42 to a pair of driven front wheels 20. Vehicle 40 is otherwise substantially similar to vehicle 8 and vehicle 8'. Accordingly, like elements will retain their previously introduced reference numerals. However, it should be appreciated that the rear axle 22 of vehicle 40 may be substantially downsized when compared to the rear drive axles of vehicles 8 and 8' because engine torque is not directly transferred to the rear axle of vehicle 40. On the contrary, rear axle 22 is only driven via propeller shaft and energy storage assembly 10 during certain modes of operation as will be described in greater detail hereinafter. Therefore, a substantial cost and weight savings may be realized through the use of smaller and lighter driveline and drive axle components.

Figure 4:
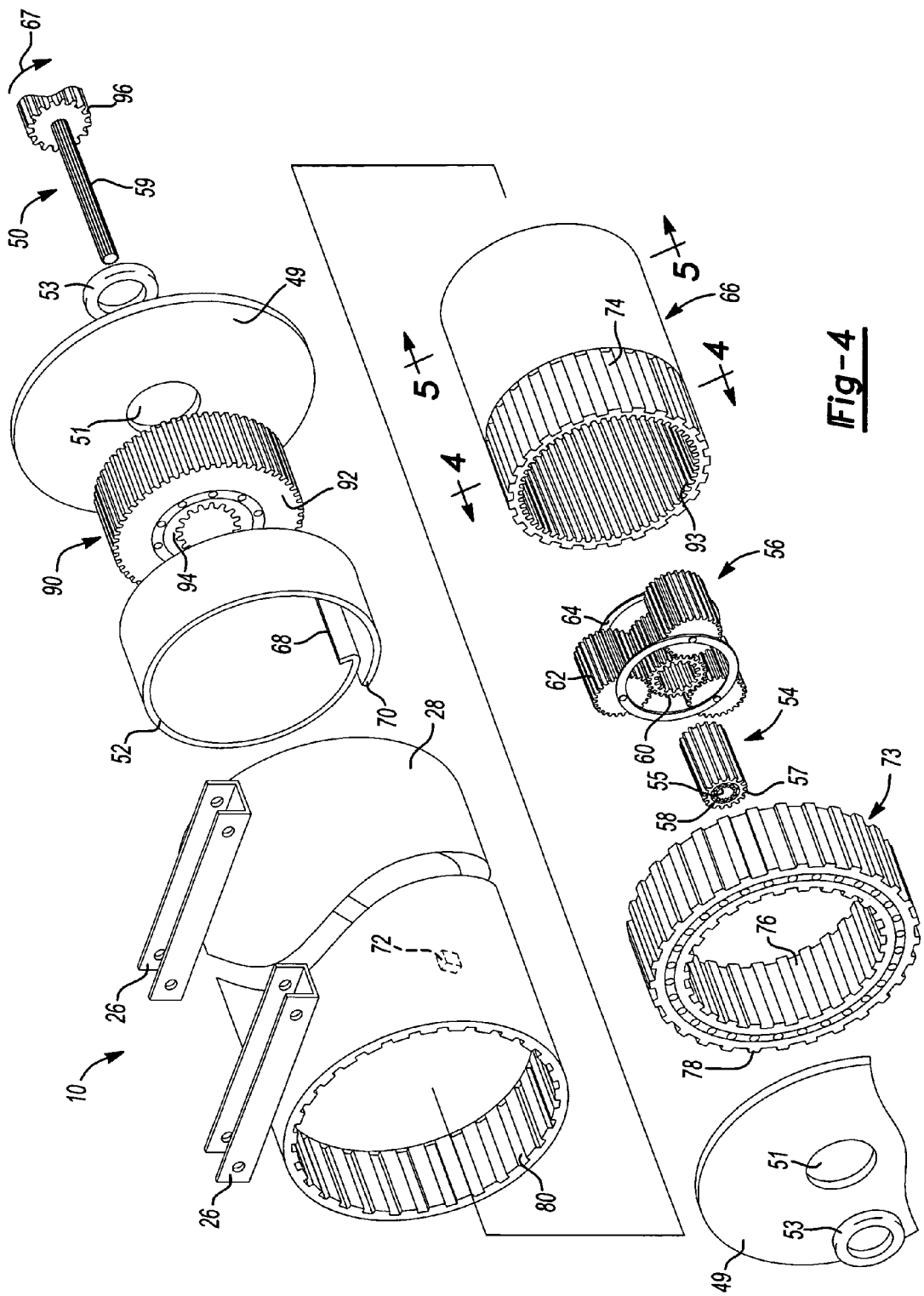
FIG. 4 is an exploded perspective view of the propeller shaft and energy storage assembly.
Figure 5:
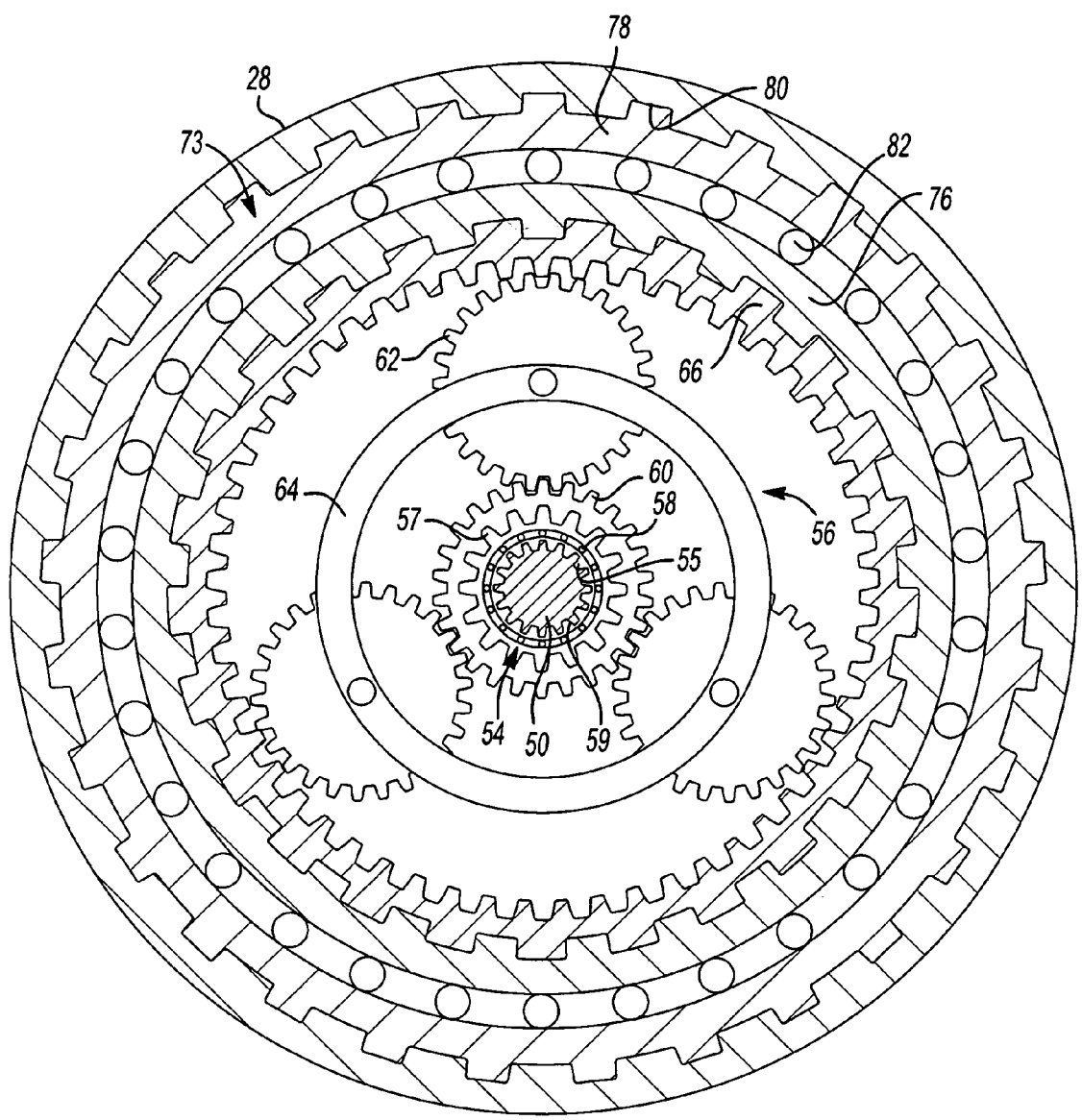
FIG. 5 is a cross-sectional view of the propeller shaft and energy storage assembly taken along line 44 as shown in FIG. 4.
Figure 6:
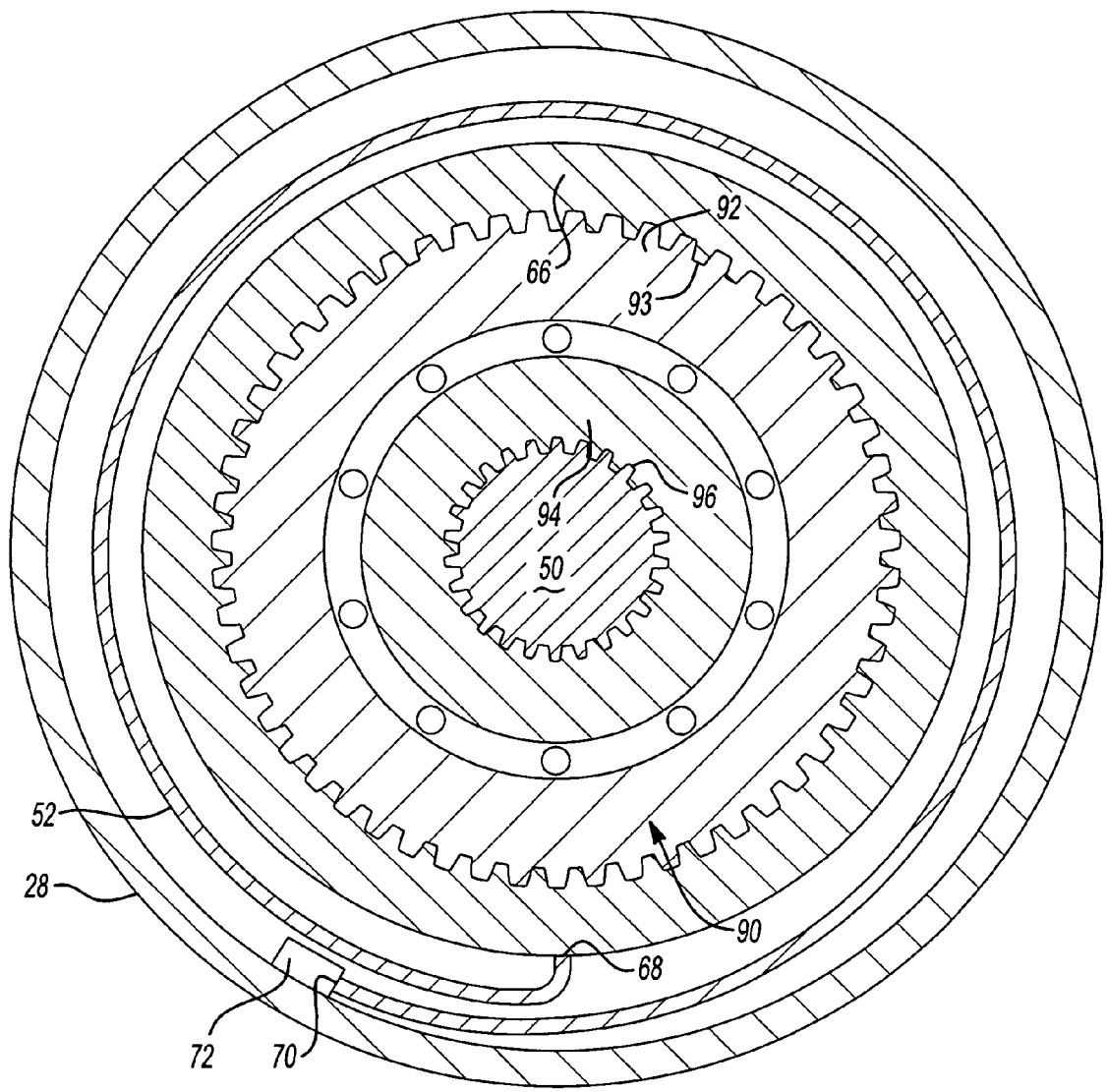
FIG. 6 is a cross-sectional view of the propeller shaft and energy storage assembly taken along line 5-5 as shown in FIG. 4.

FIGS. 4-6 depict propeller shaft and energy storage assembly 10 in greater detail. Propeller shaft and energy storage assembly 10 is selectively operable in an energy storage mode where energy may be transferred from a propeller shaft 50, also known as a propshaft or driveshaft, to an energy storage device such as a spring 52. The propeller shaft and energy storage assembly 10 is also operable in an energy retention mode where energy stored within spring 52 is retained for later introduction into the driveline. Propeller shaft and energy storage assembly 10 is operable in an energy release mode where energy stored within spring 52 is transferred to propeller shaft to accelerate vehicle 8. During all modes of operation of the propeller shaft and energy storage assembly 10, propeller shaft 50 continuously drivingly interconnects rear axle 22 and transmission 18. Propeller shaft 50 passes through housing 28 to accomplish this task.

Front and rear cover plates 49 cover openings formed at each end of housing 28. Each cover plate 49 includes an aperture 51 extending through the plate. Propeller shaft 50 extends through each aperture 51. Seals 53 sealingly engage portions of propeller shaft 50 to protect the components placed within housing 28 from contamination.

During the energy storage mode of operation, a first torque path is utilized. The first torque path includes propeller shaft 50, a first clutch 54, a planetary gearset 56 and spring 52. Torque may be selectively transferred along the first torque path during vehicle forward motion while the propeller shaft and energy storage assembly 10 operates in the energy storage mode. While it is possible to enter the energy storage mode while vehicle 40 is being powered by engine 16, it is more likely that the energy storage mode will be entered when the vehicle operator is not requesting torque supply from engine 16. A driver requested deceleration is an example of one such vehicle operating condition where the throttle position is closed and a brake pedal is depressed. Another possible time to enter the energy storage mode is during coasting when the throttle position is closed and the brakes are not being applied.

First clutch 54 includes an inner race 55, an outer race 57 and a plurality of balls 58 positioned between inner race 55 and outer race 57. First clutch 54 is operable to allow inner race 55 to rotate relative to outer race 57 in a disengaged mode. First clutch 54 is also operable in an engaged mode where relative rotation between inner race 55 and outer race 57 is restricted. Inner race 55 is in splined engagement with an external spline 59 formed on a portion of propeller shaft 50. Outer race 57 is in splined engagement with a sun gear 60 of planetary gearset 56. During the energy storage mode of operation, first clutch 54 is engaged to transfer torque from propeller shaft 50 to sun gear 60 of planetary gearset 56.

Planetary gearset 56 also includes three pinion gears 62 rotatably supported by a carrier 64. A ring gear 66 is formed as an elongated, hollow substantially cylindrical member. Pinion gears 62 are in driving meshing engagement with sun gear 60 and ring gear 66. When first clutch 54 is engaged, rotation of propeller shaft 50 in a first direction as indicated by an arrow 67 causes ring gear 66 to rotate in an opposite direction.

Spring 52 is a torsion spring shown in a "free" state in FIG. 4. Spring 52 may be deflected by being wound or unwound from the free state to store energy. Spring 52 has a first end 68 mounted to ring gear 66 and a second end 70 mounted to housing 28. A projection 72 provides an attachment point for mounting spring 52 to housing 28. Accordingly, when ring gear 66 rotates, spring 52 is deflected to store energy.

Once spring 52 has been deflected, propeller shaft and energy storage assembly 10 is operated in the energy retention mode. At this time, a second clutch 73 is actuated to retain the energy stored within spring 52. Torque travels along a second path to maintain the deflected position of coil spring 52 and store energy. Specifically, ring gear 66 includes an externally splined portion 74 drivingly engaged with an inner race 76 of second clutch 73. Second clutch 73 includes an outer race 78 having an external spline drivingly engaged with an internal spline 80 formed on housing 28. A plurality of balls 82 (FIG. 5) are positioned between inner race 76 and outer race 78. Housing 28 is mounted to frame 30 and is restricted from rotation. While second clutch 73 is engaged, relative movement between inner race 76 and outer race 78 is restricted. Therefore, relative movement between ring gear 66 and housing 28 is also restricted. Accordingly, the deflected position of spring 52 is maintained. During the energy retention mode, first clutch 54 is released to allow propeller shaft 50 to continue to rotate in direction 67. During this mode of operation, torque is transferred from engine 16 to rear axle 22 without interaction between propeller shaft 50 and the energy storage portion of propeller shaft and energy storage assembly 10.

At an appropriate time such as at vehicle launch, the energy release mode is entered. During the energy release mode, a third path transfers torque from spring 52 to propeller shaft 50. Specifically, second clutch 73 is released to allow relative rotation between ring gear 66 and housing 28. A third clutch 90 is engaged to provide a path for torque to flow from the ring gear 66 to propeller shaft 50. Third clutch 90 includes an outer race 92 in driving engagement with inner teeth 93 formed on ring gear 66. Third clutch 90 includes an inner race 94 in driving engagement with an outer splined portion 96 of propeller shaft 50. It should be appreciated that during the energy release mode, ring gear 66 rotates in the same direction as propeller shaft 50 in direction 67. Accordingly, propeller shaft and energy storage assembly 10 is operable to transfer energy from propeller shaft 50 while vehicle 8 is traveling in a forward direction and propeller shaft 50 rotates in direction 67. Energy may be transferred from spring 52 into propeller shaft 50 while the vehicle is stopped or traveling in a forward direction. Energy may be stored while the vehicle is stopped or traveling in either forward or reverse.

The description of the invention is merely exemplary in nature and variations are not to be regarded as a departure from the spirit and scope of the invention. For example, a planetary gearset need not be present in the propeller shaft and energy storage assembly to provide the described functions. Furthermore, energy storage devices other than torsion springs are contemplated as being within the scope of the invention.

What is claimed is:

1. A propeller shaft and energy storage assembly comprising:
a propeller shaft having a first end adapted to be drivingly coupled to an engine and a second end adapted to be drivingly coupled to a driven wheel;
a first power transfer mechanism for selectively drivingly interconnecting said propeller shaft and an energy storage device to store energy in said energy storage device;
a second power transfer mechanism selectively transferring torque to retain energy stored within said energy storage device, and
a third power transfer mechanism for selectively drivingly interconnecting said energy storage device and said propeller shaft when a vehicle acceleration is desired.

2. A propeller shaft and energy storage assembly comprising:
a propeller shaft having a first end adapted to be drivingly coupled to an engine and a second end adapted to be drivingly coupled to a driven wheel;
a first rower transfer mechanism for selectively drivingly interconnecting said propeller shaft and an energy storage device to store energy in said energy storage device;
a second power transfer mechanism operable to selectively retain and release energy stored within said energy storage device, and
a third rower transfer mechanism for selectively drivingly interconnecting said energy storage device and said propeller shaft when a vehicle acceleration is desired, wherein said first power transfer mechanism includes a gearset operable to rotate a member in a first direction to deflect a spring, said third power transfer mechanism being operable to release the energy stored in said spring and rotate said member in an opposite direction when transferring the power from said energy storage device to said propeller shaft such that said propeller shaft rotates in the same direction when energy is being stored by said energy storage device and when energy is being released by said energy storage device.

3. The propeller shaft and energy storage assembly of claim 2 wherein said gearset is a planetary gearset with a sun gear selectively drivingly coupled to said propeller shaft.

4. The propeller shaft and energy storage assembly of claim 3 wherein said member is a ring gear of said planetary gearset.

5. The propeller shaft and energy storage assembly of claim 4 wherein said third power transfer mechanism includes a selectively actuatable clutch interconnecting said ring gear and said propeller shaft.

6. A propeller shaft and energy storage assembly comprising:
a propeller shaft having a first end adapted to be drivingly coupled to an engine and a second end adapted to be drivingly coupled to a driven wheel;
a first power transfer mechanism for selectively drivingly interconnecting said propeller shaft and an energy storage device to store energy in said energy storage device;
a second power transfer mechanism operable to selectively retain and release energy stored within said energy storage device;
a third rower transfer mechanism for selectively drivingly interconnecting said energy storage device and said propeller shaft when a vehicle acceleration is desired; and
a housing adapted to be coupled to a vehicle frame, wherein said second power transfer mechanism includes a clutch interconnecting a ring gear and said housing.

7. The propeller shaft and energy storage assembly of claim 6 wherein said propeller shaft extends through said housing.

8. The propeller shaft and energy storage assembly of claim 1 wherein said propeller shaft and energy storage assembly is operable in an energy storage mode where said first power transfer mechanism transfers energy from said propeller shaft to said energy storage device, an energy retention mode where said second power transfer mechanism transfers torque to retain energy in said energy storage device and an energy release mode where said third power transfer mechanism transfers energy from said energy storage device to said propeller shaft.

9. The propeller shaft and energy storage assembly of claim 1 wherein said energy storage device is a spring.

10. A propeller shaft and energy storage assembly comprising:
a propeller shaft having a first end adapted to be drivingly coupled to an engine and a second end adapted to be drivingly coupled to a driven wheel;
a first clutch selectively operable to drivingly interconnect said propeller shaft and a spring to store energy in said spring;
a second clutch operable to restrict movement of said spring to retain said stored energy within said spring; and
a third clutch operable to selectively drivingly couple said spring and said propeller shaft to transfer said stored energy to said propeller shaft.

11. The propeller shaft and energy storage assembly of claim 10 further including a housing adapted to be coupled to a vehicle frame wherein said propeller shaft extends through said housing.

12. The propeller shaft and energy storage assembly of claim 11 wherein said spring is mounted to said housing.

13. The propeller shaft and energy storage assembly of claim 12 wherein said spring is enclosed within said housing.

14. The propeller shaft and energy storage assembly of claim 13 further including a planetary gearset interconnecting said propeller shaft and said spring.

15. The propeller shaft and energy storage assembly of claim 14 wherein said propeller shaft rotates in the same direction when energy is being stored within said spring and when energy is being transferred from said spring to said propeller shaft.

16. A vehicle comprising:
an engine;
front and rear pairs of wheels;
a driveline operable to selectively transfer power from the engine to the pair of rear wheels, the driveline including a propeller shaft and energy storage assembly including a propeller shaft having a first end selectively drivingly coupled to the engine and a second end drivingly coupled to the pair of rear wheels;
a first power transfer mechanism operable to drivingly interconnect the propeller shaft and an energy storage device to transfer energy to the energy storage device;
a second power transfer mechanism selectively transferring torque to retain the energy stored within the energy storage device, and
a third power transfer mechanism operable to drivingly interconnect the energy storage device and the propeller shaft to transfer energy from the energy storage device to the pair of rear wheels.

17. The vehicle of claim 16 wherein the propeller shaft and energy storage assembly is operable in an energy storage mode where the first power transfer mechanism transfers energy from the propeller shaft to the energy storage device, an energy retention mode where the second power transfer mechanism transfers torque to retain energy in the energy storage device and an energy release mode where the third power transfer mechanism transfers energy from the energy storage device to the propeller shaft.

18. The vehicle of claim 17 wherein the energy storage device is a spring.

19. A vehicle comprising:
an engine;
front and rear pairs of wheels;
a driveline operable to selectively transfer power from the engine to the pair of rear wheels, the driveline including a propeller shaft and energy storage assembly including a propeller shaft having a first end selectively drivingly coupled to the engine and a second end drivingly coupled to the pair of rear wheels;
a first power transfer mechanism operable to drivingly interconnect the propeller shaft and an energy storage device to transfer energy to the energy storage device;
a second power transfer mechanism operable to selectively retain and release the energy stored within the energy storage device, and
a third power transfer mechanism operable to drivingly interconnect the energy storage device and the propeller shaft to transfer energy from the energy storage device to the pair of rear wheels, wherein the energy storage device includes a housing mounted to a frame of the vehicle, the propeller shaft extending through the housing.

20. The vehicle of claim 16 wherein the driveline is operable to selectively transfer power from the engine to the front pair of wheels.

21. The vehicle of claim 20 further including a transfer case having a first output shaft operable to transfer torque to the pair of rear wheels and a second output shaft operable to transfer torque to the front pair of wheels.

22. A method of storing and releasing energy in a vehicle including an engine drivingly coupled to a driveline, the driveline having a propeller shaft and an energy storage device, the method comprising:
placing the vehicle in motion;
drivingly coupling the propeller shaft to the energy storage device to transfer energy from the moving vehicle to a spring;
de-coupling the propeller shaft from the energy storage device;
maintaining a deflected position of the spring to retain the stored energy in the energy storage device; and
drivingly coupling the energy storage device with the propeller shaft to transfer energy from the energy storage device to the propeller shaft and accelerate the vehicle.

23. The method of claim 22 wherein drivingly coupling the propeller shaft to the energy storage device includes actuating a first clutch.

24. The method of claim 23 wherein drivingly coupling the propeller shaft to the energy storage device includes transferring torque through a planetary gearset.

25. The method of claim 24 wherein retaining the stored energy includes transferring torque through a rower transfer mechanism coupled to the spring.

26. A method of storing and releasing energy in a vehicle including an engine drivingly coupled to a driveline, the driveline having a propeller shaft and an energy storage device, the method comprising:
placing the vehicle in motion;
drivingly coupling the propeller shaft to the energy storage device to transfer energy from the moving vehicle to the energy storage device;
de-coupling the propeller shaft from the energy storage device;
retaining the stored energy in the energy storage device;
drivingly coupling the energy storage device with the propeller shaft to transfer energy from the energy storage device to the propeller shaft and accelerate the vehicle; and
extending the propeller shaft through the energy storage device.

27. The method of claim 22 further including rotating the propeller shaft in the same direction during the drivingly coupling the propeller shaft to the energy storage device step and the drivingly coupling the energy storage device with the propeller shaft step.

28. The method of claim 22 further including transferring power from the engine through the propeller shaft to accelerate the vehicle.

29. The method of claim 23 wherein the step of de-coupling the propeller shaft from the energy storage device includes deactivating the first clutch.

30. The method of claim 29 wherein the step of drivingly coupling the energy storage device with the propeller shaft includes actuating a second clutch.

* * * * *